2,841,606
Patented July 1, 1958

2,841,606
TETRA-AROMATIC ALKYLENE DIPHOSPHITES

Ingenuin Hechenbleikner and Francis C. Lanoue, Adams, Mass., assignors to Shea Chemical Corporation, Jeffersonville, Ind., a corporation of Tennessee No Drawing. Application December 28, 1955
Serial No. 555,763

3 Claims. (Cl. 260—461)

This invention relates to the production of new organic derivatives of phosphorus and, more particularly, to the production of new open chain containing derivatives of trivalent phosphorus.

It is an object of the present invention to provide stable, high-boiling, non-discoloring open chain containing organic derivatives of trivalent phosphorus.

It is a further object of this invention to produce new organic derivates of trivalent phosphorus which possess good stability action for resins.

Another object is the preparation of new organic derivates of trivalent phosphorus which are good antioxidants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

These objects are accomplished by the preparation of organic phosphites having the formula:

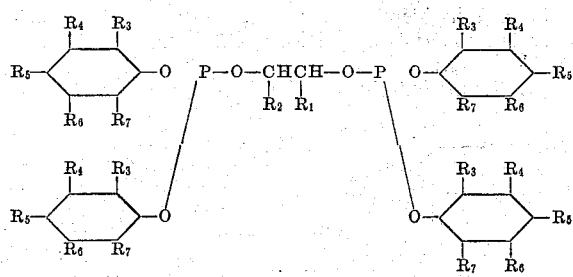

wherein $R_1$ and $R_2$ can be the same or different and are hydrogen or an alkyl group and $R_3$, $R_4$, $R_5$, $R_6$ and $R_7$ are the same or different and are hydrogen, halogen, aryl, alkyl, cycloalkyl, nitro, alkoxy, aryloxy and aryl, $R_3$ and $R_4$ are joined to complete a naphthalene ring and $R_4$ and $R_5$ are joined to complete a naphthalene ring.

While, preferably, both aromatic radicals, attached to the same phosphorus atom, are identical, it is also possible to have them of different nature.

Typical examples of compounds within the present invention are tetraphenyl ethylene diphosphite; tetra-(2-chlorophenyl) ethylene diphosphite; tetra - (3 - chlorophenyl) ethylene diphosphite; tetra-(4-chlorophenyl) ethylene diphosphite; tetra-(2,3-dichlorophenyl)ethylene diphosphite; tetra-(2,4-dichlorophenyl)ethylene diphosphite; tetra - (2,5 - dichlorophenyl)ethylene diphosphite; tetra - (2,6 - dichlorophenyl)ethylene diphosphite; tetra-(3,4-dichlorophenyl)ethylene diphosphite; tetra-(3,5-dichlorophenyl)ethylene diphosphite; tetra - (2 - bromophenyl)ethylene diphosphite; tetra - (3 - bromophenyl)-ethylene diphosphite; tetra - (4 - bromophenyl)ethylene diphosphite; tetra-(2-iodophenyl) ethylene diphosphite (and the corresponding 3 and 4 mono-iodophenyl diphosphites); tetra-(2-fluorophenyl) ethylene diphosphite (and the corresponding 3 and 4 mono-fluorophenyl diphosphites); tetra-(2-chloro-4-bromophenyl)ethylene diphosphite; tetra-(2-methylphenyl) ethylene diphosphite; tetra - (3 - methylphenyl)ethylene diphosphite; tetra-(4-methylphenyl) ethylene diphosphite; tetra-(3,5-dimethylphenyl) ethylene diphosphite; tetra-(2-ethylphenyl) ethylene diphosphite; tetra-(4-ethylphenyl) ethylene diphosphite; tetra-(2-hexylphenyl) ethylene diphosphite; tetra-(2-cyclohexylphenyl) ethylene diphosphite; tetra-(4-octylphenyl) ethylene diphosphite; tetra-(3-isobutylphenyl) ethylene diphosphite; tetra-(2-dodecylphenyl) ethylene diphosphite; tetra-(2-methoxyphenyl) ethylene diphosphite; tetra-(3-methoxyphenyl)ethylene diphosphite; tetra-(4-methoxyphenyl) ethylene diphosphite; tetra-(2-ethoxyphenyl) ethylene diphosphite; tetra-(2-octoxyphenyl) ethylene diphosphite; tetra - (2 - amylphenyl) ethylene diphosphite; tetra-(2-butylphenyl) ethylene diphosphite; tetra-(2-tertiary butylphenyl)ethylene diphosphite; tetra-(2-secondary butylphenyl) ethylene diphosphite; tetra-(2-phenoxyphenyl) ethylene diphosphite; tetra-(2-α-naphthoxyphenyl) ethylene diphosphite; tetra-(2-β-naphthoxyphenyl) ethylene diphosphite; tetra-(2-phenylphenyl) ethylene diphosphite; tetra-(α-naphthyl) ethylene diphosphite; tetra-(2-nitrophenyl) ethylene diphosphite; tetra-(3-nitrophenyl) ethylene diphosphite; tetra-(4-nitrophenyl ethylene diphosphite; tetra phenyl-1-methylethylene diphosphite; tetra-(2 - chlorophenyl) - 1 - methylethylene diphosphite; tetra phenyl-1,2-dimethylethylene diphosphite; tetra-(3-chlorophenyl) 1,2-dimethylethylene diphosphite; tetra phenyl-1-ethyl ethylene diphosphite; 1,2-di(phenyl)1,2-di(2-methylphenyl) ethylene diphosphite; 1,1-di(phenyl) 2,2-di-(2-methylphenyl) ethylene diphosphite.

The above compounds can be made by reacting 2 mols of the appropriate secondary aromatic monochlorophosphite with the appropriate glycol having adjacent hydroxyl groups in the presence of two mols of a tertiary base, such as pyridine or triethyl amine. When a mixed ester of the type 1,1-diphenyl, 2,2-di-(2-methylphenyl) ethylene diphosphite is prepared, then there is used a mixture of one mol of diphenyl mono-chlorophosphite and one mol of di-(2-methylphenyl) mono-chlorophosphite, with one mol of the glycol and two mols of the tertiary amine. The general equation for the reaction involved is:

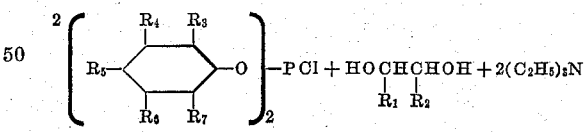

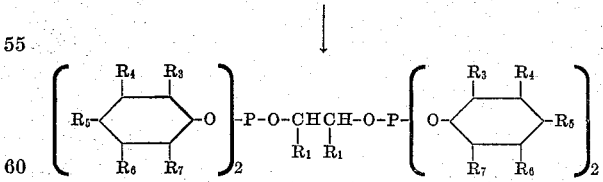

where $R_1$, $R_2$, $R_3$, $R_4$, $R_5$, $R_6$ and $R_7$ have the same definition as that previously stated.

Typical examples of mono-chlorophosphites which can be used as starting materials are diphenyl monochlorophosphite; phenyl, 2-methylphenyl mono-chlorophosphite; di-(2-chlorophenyl) mono-chlorophosphite; di - (3 - chlorophenyl) mono - chlorophosphite; di - (4-chlorophenyl) mono - chlorophosphite; di - (2,3 - dichlorophenyl) mono - chlorophosphite; di - (2,4 -dichlorophenyl) mono - chlorophosphite; di-(2,5 - dichlorophenyl) mono - chlorophosphite; di - (2,6 - dichlorophenyl) mono - chlorophosphite; di -(3,4 - dichlorophenyl) mono - chlorophosphite; di - (3,5 - dichlorophenyl) mono - chlorophosphite; di -(2 - bromophenyl) mono - chlorophosphite; di - (3 - bromophenyl) monochlorophosphite; di - (4 - bromophenyl) mono - chlorophosphite; di-(2-iodophenyl) mono-chlorophosphite; di-(2-fluorophenyl) mono-chlorophosphite; di-(2-chloro, 4-bromophenyl) mono - chlorophosphite; di - (2 - methylphenyl) mono -chlorophosphite; di - (3 - methylphenyl) mono - chlorophosphite; di - (4 - methylphenyl) monochlorophosphite; di - (3,5 - di - methylphenyl) monochlorophosphite; di - (2 - ethylphenyl) mono - chlorophosphite; di - (4 - ethylphenyl) mono - chlorophosphite; di - (2 - hexylphenyl) mono - chlorophosphite; di - (4-octylphenyl) mono - chlorophosphite; di - (3 - isobutylphenyl) mono - chlorophosphite; di - (2 - dodecylphenyl) mono - chlorophosphite; di - (2 - methoxyphenyl) monochlorophosphite; di - (3 - methoxyphenyl) mono - chlorophosphite; di - (4 - methoxyphenyl) mono - chlorophosphite; di - (2 - ethoxyphenyl) mono - chlorophosphite; di-(2 - amylphenyl) mono - chlorophosphite; di - (2 - butylphenyl) mono - chlorophosphite; di - (2 - tertiary butylphenyl) mono - chlorophosphite; di - (2 - secondary butylphenyl) mono - chlorophosphite; di - (2 - phenoxyphenyl) mono - chlorophosphite; di - (2 - α - naphthoxyphenyl) mono - chlorophosphite; di - (2 - cyclohexylphenyl) monochlorophosphite; di - (2 - β - naphthoxyphenyl) monochlorophosphite; di - (2 - phenylphenyl) mono - chlorophosphite; di - (α - naphthyl) mono - chlorophosphite; di-(β - naphthyl) mono - chlorophosphite; di - (2 - nitrophenyl) mono - chlorophosphite; di - (3 - nitrophenyl) mono-chlorophosphite and di-(4-nitrophenyl) monochlorophosphite.

Many of the above secondary aromatic monochlorophosphites are old compounds and are shown, for example, in Kosolapoff "Organo-Phosphorus Compounds" on page 200. Those which are new can be prepared by reacting the corresponding phenol with phosphorus trichloride in the manner set forth on page 181 of Kosolapoff, using 2 mols of the phenol per mol of phosphorus trichloride. Alternatively, they can be prepared as set forth on page 186 of Kosolapoff, by disproportionation of a mixture of the corresponding neutral phosphite ester and phosphorus trichloride.

As the glycol reactant, there can be employed ethylene glycol; 1,2-propylene glycol; 1,2-butylene glycol; 2,3-butylene glycol; etc.

Instead of reacting 2 mols of a secondary aromatic mono-chlorophosphite with one mol of a glycol in the presence of two mols of a tertiary amine, it is also possible to form the new compounds by reacting 2 mols of the corresponding tertiary aromatic phosphite with one mol of the desired glycol. The reaction is carried out, for example, by reacting at 65° C., at atmospheric pressure and then separating the desired glycol ester product from the phenol formed by distillation at reduced pressure, e. g., 1 mm. In this alternative procedure, it is not necessary to use a tertiary amine. Typical phosphites which can be used in this alternative procedure are triphenyl phosphite, tri-4-chlorophenyl phosphite; tri-2-methoxyphenyl phosphite; tri-4-nitrophenyl phosphite; tri-2-methylphenyl phosphite; tri-3-methylphenyl phosphite; tri-4-methylphenyl phosphite; tri-4-tertiary butylphenyl phosphite; tri-tertiary octylphenyl phosphite; tri-phenylphenyl phosphite; tri-o-cyclohexylphenyl phosphite; tri-α-naphthyl phosphite; tri-β-naphthyl phosphite; tri-1-(2,4-dibromo)naphthyl phosphite.

It is important in forming the compounds of the present invention that the proportions above referred to be used, as any substantial deviation there from results in the formation of other compounds which are not the subject of the present invention. Sometimes, the reaction is facilitated by having an inert organic solvent, such as ether or benzene, present.

The compounds of the present invention are useful as antioxidants for natural rubber and various butadiene synthetic rubbers, as antioxidants for gasoline, as stabilizers for polyvinyl chloride and as plasticizers for vinyl chloride resins and other plastics.

*Example 1*

One mol of ethylene glycol was mixed with 2 mols of triethyl amine in one liter of diethyl ether at room temperature and there was gradually added over a period of about ½ hour 2 mols of diphenyl monochlorophosphite. When the addition was complete, the triethylamine hydrochloride formed was filtered off and the solvent stripped off at atmospheric pressure. The residue was subjected to distillation at reduced pressure (about 0.5 mm.) up to a temperature of 100° C. The tetraphenyl ethylene diphosphite remained as a non-volatile viscous colorless liquid residue, having the following physical and chemical properties: $N_d^{24.1}$ 1.57510; density 1.2060; phosphorus 12.4% (theory 12.55%). It was impossible to distil the new ester, as it decomposes before its boiling point even at 0.5 mm. The formula of the compound is:

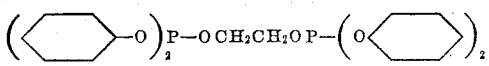

*Example 2*

Example 1 was repeated, using propylene glycol in place of ethylene glycol. The product obtained was tetraphenyl propylene disphosphite having the formula:

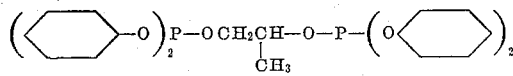

*Example 3*

The other compounds of the present invention can be obtained in identical fashion by using the appropriate starting materials as previously set forth.

We claim:
1. Compounds having the formula:

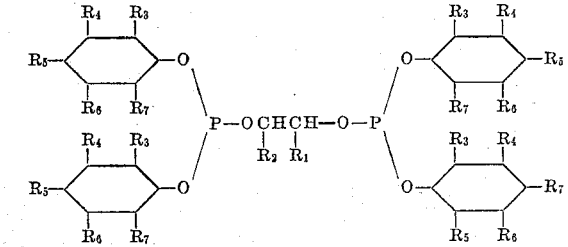

wherein $R_1$ and $R_2$ are selected from the group consisting of hydrogen and a lower alkyl group and $R_3$, $R_4$, $R_5$, $R_6$ and $R_7$ are selected from the group consisting of hydrogen and lower alkyl groups.

2. Tetra-mono lower alkylphenyl 1,2-alkylenediphosphites.

3. Tetra-phenyl ethylene diphosphite.

References Cited in the file of this patent

Kabachnik: Chemical Abstracts, vol. 42, page 5845 (1948).